Oct. 30, 1962     B. W. TÖRNQVIST     3,061,354
DEVICE FOR HANDLING VEHICLES
Filed Nov. 30, 1959     2 Sheets-Sheet 1
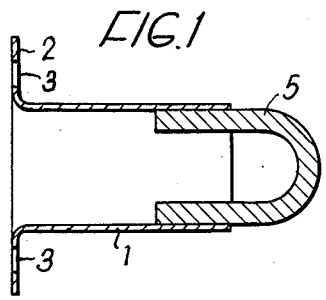
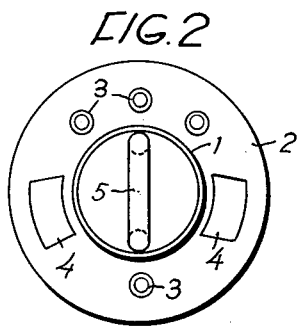
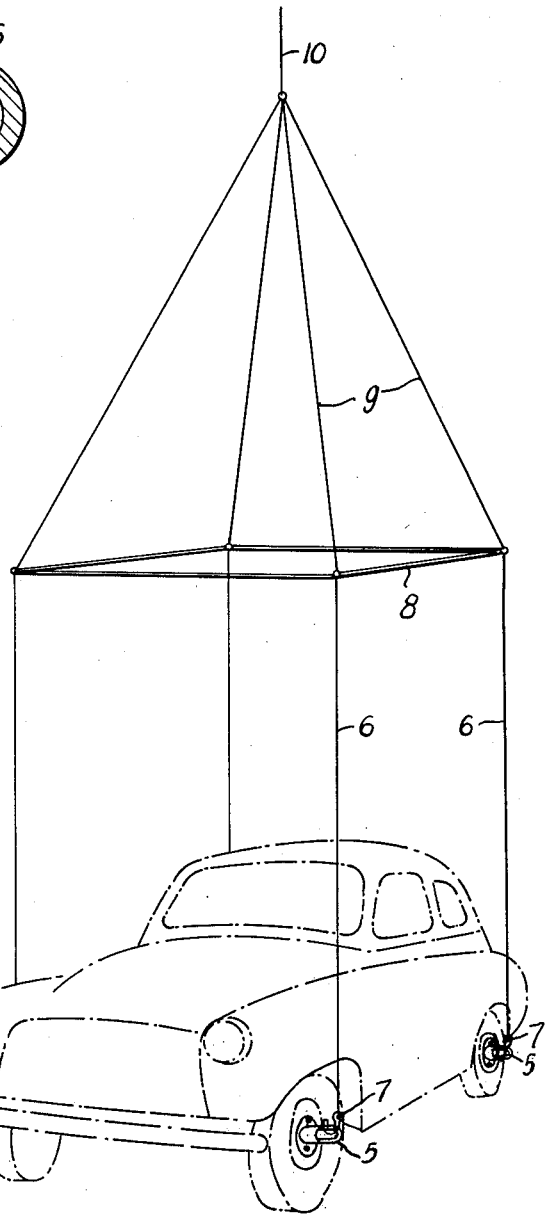
INVENTOR.
BENGT WILHELM TÖRNQVIST
BY
ATTY.

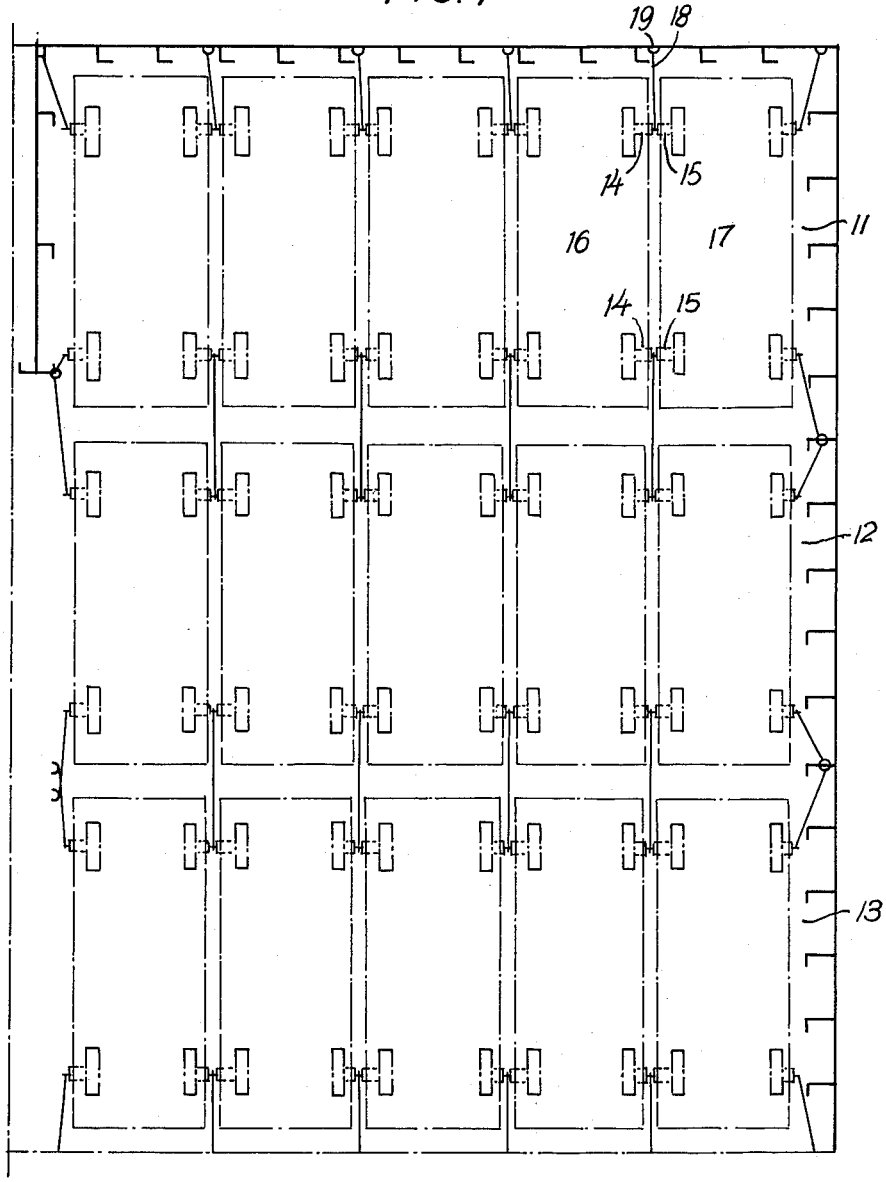

United States Patent Office 3,061,354
Patented Oct. 30, 1962

3,061,354
DEVICE FOR HANDLING VEHICLES
Bengt Wilhelm Törnqvist, Dalkarlsgrand 6,
Bromma, Sweden
Filed Nov. 30, 1959, Ser. No. 856,056
Claims priority, application Sweden Dec. 5, 1958
3 Claims. (Cl. 294—74)

The apparatus heretofor used for loading and unloading and lashing motor cars and other vehicles on for example ships, railway waggons and motor trucks are not satisfactory, and the damages arising in connection with such transport cause considerable losses. Existing apparatus are also inconvenient to handle and require unnecessarily long time in use.

The present invention has for its object to facilitate the apparatus employed in connection with the transport of vehicles on vessels and other means of conveyance, particularly for the elevation of the vehicle and for its efficient lashing during conveyance.

Previously it has been suggested to attach to the hub of the wheel of the vehicle, an element similar to a tripod or spider, the legs of which are provided with apertures for the studs by which the wheel is normally secured to the hub. This apparatus is inconvenient in use, since even if it is made from high quality steel, it has occurred that the legs become deformed so that after its use on one vehicle it will not fit to the studs of the next one. In consequence, additional adjustments must be performed at each case of use, and in spite of these steps the apparatus is cumbersome to apply. As a rule, the known tripod fits only to cars having five hub studs, whereas many cars have four studs. The weak legs necessitate that the apertures for the studs fit well on the studs, and the pitch of the studs varies somewhat for motor cars of different manufacture so that the apparatus often does not fit.

The invention has also for its object to utilize the studs, by which the wheel is attached to the hub. According to the invention, the attachment adapted to be applied by said studs is provided with a radial flange having apertures for some of the studs and cut-out portions or other apertures for the nuts located on the remainder of the studs. An attachment of this construction may be made sufficiently stiff as to its shape to be prevented from being deformed as a consequence of the stresses arising during lifting and conveyance. Furthermore, it can be constructed so as to fit to the hub structure of the cars and other vehicles occurring in the market, and thus can be easily set in place and be secured. The flange offers a great surface of engagement to the side of the wheel hub, and as a result the attachment may be satisfactory, even if the holes for the studs are somewhat larger than the studs themselves. This in turn provides the possibility of using one and the same attachment on cars of different manufactures, in which the distances between the holes for the studs varies to some extent.

The flange may be integral with a piece of tube provided with a clamp or ring in which ropes or wires of a hoisting apparatus or a lashing element can be attached. The piece of tube may be cylindric or tapering toward the end opposite to the flange, i.e. the outer end of the attachment.

An application of the invention is illustrated by way of example on the accompanying drawing. FIG. 1 illustrates an axial section of the attachment and FIG. 2 an end view thereof. FIG. 3 is a perspective view of a vehicle, the attachments being mounted thereon and suspended from a lifting means. FIG. 4 is a plan view of a number of cars lashed on a deck.

As shown in the drawing the attachment comprises a tube 1 having a radial flange 2 provided with stud holes 3 and greater cut-outs 4. The holes 3 are adapted to fit to two or three of the four or five studs which are ordinary on the hub of vehicles of the types occurring in the market and are adapted to keep the wheel mounted on the hub, due regard being paid to clearance if desired. The cut-outs or apertures 4 are of a size sufficient to be applied around the nuts which usually keep the wheel on the studs. Thus it is only necessary to release and remove two or three of the four or five nuts which hold the wheel to be able to apply the attachment on the wheel hub. After the mounting operation the flange 2 will engage the outer face of the hub steadily after the removed nuts have been mounted and tightened against the outer face of the flange.

The holes 3 are preferably arranged in radial flange 2 in such a manner that a first group of holes about 180° apart are disposed to receive two studs of a four-stud wheel hub, and a second group of holes having one hole common to the first group and two holes spaced about 72° apart and each spaced about 144° from the common hole are disposed to receive three studs of a five-stud wheel hub.

Mounted at the outer end of the tube 1 is a bow 5, the back portion of which extends outside the tube, the legs being secured in the same. Suitably, they are welded to the inner wall of the tube. This construction is advantageous from a welding point of view because the legs of the bow may be made to exert an outward spring action in the tube, so that the bow is kept automatically in correct position in the axial central plane of the tube, after the bow has been pushed into its place within the end of the tube. The welding operation may thus be performed without using additional holding means.

As an alternative to the bow, the tube may be compressed radially from two opposite sides at its outer end which is then provided with an aperture.

In some instances it occurs that the ends of the studs on the hub of the motor car are countersunk so that the flange can not be applied. In such case it is possible to use an extension bolt which has inside screw threads in one end thereof and outside screw threads on the other end. This bolt is screwed onto the stud of the hub, whereupon the flange may be applied and the nut be screwed onto the bolt end having outside screw threads.

FIG. 3 illustrates in what manner the described attachments are mounted on the hubs of a motor car and cables 6 are attached to the bows by hooks 7. There is one cable 6 for each wheel, and the cables are suspended from a rectangular spreader 8 so as to avoid contact with the splash guards of the car. The spreader is suspended, by means of cables 9, from a common lifting cable 10 of a crane or other lifting machine.

The attachment referred to above has the advantage of enabling a reliable lashing of a plurality of vehicles beside one another, for example on a deck of a vessel. This is illustrated in FIG. 4. The cars are shown as set in a plurality of rows 11, 12, 13 behind each other. There may be a variable number of cars in each row. In FIG. 4 there are shown five in each row. The cars are set in such a position that the attachments 14 at one side of a car 16 are located opposite the attachments 15 on the other side of the adjacent car 17. This results in the advantage that adjacent cars may be lashed by lashing means which are common to them. For example, there is shown a cable 18 which connects the attachments 14 and 15 with the margin of the deck at 19.

The attachment described hereinbefore may be formed in various manners within the scope of the invention. The piece of tube and the flange may be formed integral or as two parts welded together. The piece of tube may be substituted by a cup-shaped or conical element having the flange mounted at or formed integral with its mouth, said element tapering from the flange outwardly, where an aperture for a hook may be made.

What I claim is:

1. A vehicle-handling device for attachment to wheel-mounting studs carried by a wheel hub of a vehicle both of the type provided with four studs and of the type provided with five studs, comprising a continuous radial flange having a plurality of groups of stud receiving holes therein, a first group of holes being disposed about 180° apart to receive two studs of a four-stud wheel hub and a second group of holes having one hole common to the first group and two holes spaced about 72° apart and each spaced about 144° from said common hole to receive three studs of a five-stud wheel hub, said flange also having cutouts to receive studs unattached to said flange with wheel retaining nuts thereon, a tubular member connected at one end to said continuous radial flange and means at the other end of said tubular member for engagement by lifting or lashing means.

2. A device according to claim 1 in which said continuous radial flange and said tubular member form an integral assembly.

3. A vehicle-handling device for attachment to wheel-mounting studs carried by a wheel hub of a vehicle both of the type provided with four studs and of the type provided with five studs, comprising a continuous radial flange having a plurality of groups of stud receiving holes therein, a first group of holes being disposed about 180° apart to receive two studs of a four-stud wheel hub and a second group of holes having one hole common to the first group and two holes spaced about 72° apart and each spaced about 144° from said common hole to receive three studs of a five-stud wheel hub, said flange also having cutouts between the common stud receiving hole and the other holes of the second group of holes to receive studs unattached to said flange with wheel retaining nuts thereon, a tubular member connected at one end to said continuous radial flange and means at the other end of said tubular member for engagement by lifting or lashing means.

References Cited in the file of this patent

UNITED STATES PATENTS

| | | |
|---|---|---|
| 1,225,946 | Fernholz | May 15, 1917 |
| 1,398,086 | Cooney | Nov. 22, 1921 |
| 1,416,191 | Girard | May 16, 1922 |
| 1,677,695 | Vogt | July 17, 1928 |
| 1,760,671 | Sullivan | May 27, 1930 |
| 1,794,321 | Rebuck | Feb. 24, 1931 |
| 1,824,634 | Snyder | Sept. 22, 1931 |
| 1,889,736 | Hice | Nov. 29, 1932 |
| 2,602,217 | Sweeney et al. | July 8, 1952 |
| 2,642,235 | Smith | June 16, 1953 |

FOREIGN PATENTS

| | | |
|---|---|---|
| 706,353 | Great Britain | Mar. 31, 1954 |